United States Patent
Klosa

[11] Patent Number: 5,825,214
[45] Date of Patent: Oct. 20, 1998

[54] INTEGRATED CIRCUIT ARRANGEMENT WITH DIODE CHARACTERISTIC

[75] Inventor: Klaus Klosa, München, Germany

[73] Assignee: Temic Telefunken microelectronic GmbH, Heilbronn, Germany

[21] Appl. No.: 685,848

[22] Filed: Jul. 24, 1996

[30] Foreign Application Priority Data

Oct. 12, 1995 [DE] Germany ................ 195 37 920.9

[51] Int. Cl.$^6$ ................................................ H02M 7/217
[52] U.S. Cl. .................. 327/104; 327/354; 327/303; 327/320; 327/327; 327/531
[58] Field of Search .................... 327/104, 354, 327/303, 309, 320, 327, 531

[56] References Cited

U.S. PATENT DOCUMENTS 5,173,849  12/1992  Brooks ............................. 363/127
5,506,527  4/1996  Rudolph et al. ..................... 327/104

FOREIGN PATENT DOCUMENTS 34 00 973   7/1985   Germany.
41 19 553  10/1992   Germany.
43 26 423   2/1995   Germany.

Primary Examiner—David C. Nelms
Assistant Examiner—Andrew Q. Tran
Attorney, Agent, or Firm—Spencer & Frank

[57] ABSTRACT

An integrated circuit arrangement with a diode characteristic including a source-drain section of a first transistor arranged in the current path between the input and output sides of the arrangement; a first inverter stage with an output fed back to its input, and whose supply voltage is provided by the voltage on the output side of the circuit arrangement; a second inverter stage to the input of which the output signal from the first inverter stage is fed and whose supply voltage is provided by the voltage on the input side of the circuit arrangement; and a third inverter stage having an input to which the output signal from the second inverter stage is fed, whose voltage supply is provided by the voltage on the output side of the circuit arrangement, and whose output signal is fed to the gate electrode of the first transistor, and thus regulates the current flow in the current path of the circuit arrangement.

4 Claims, 2 Drawing Sheets

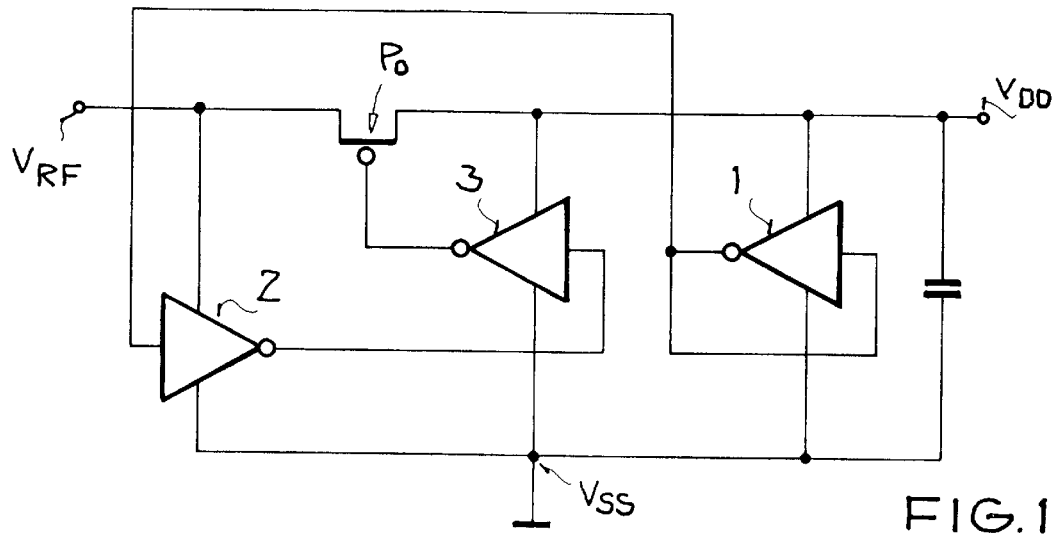
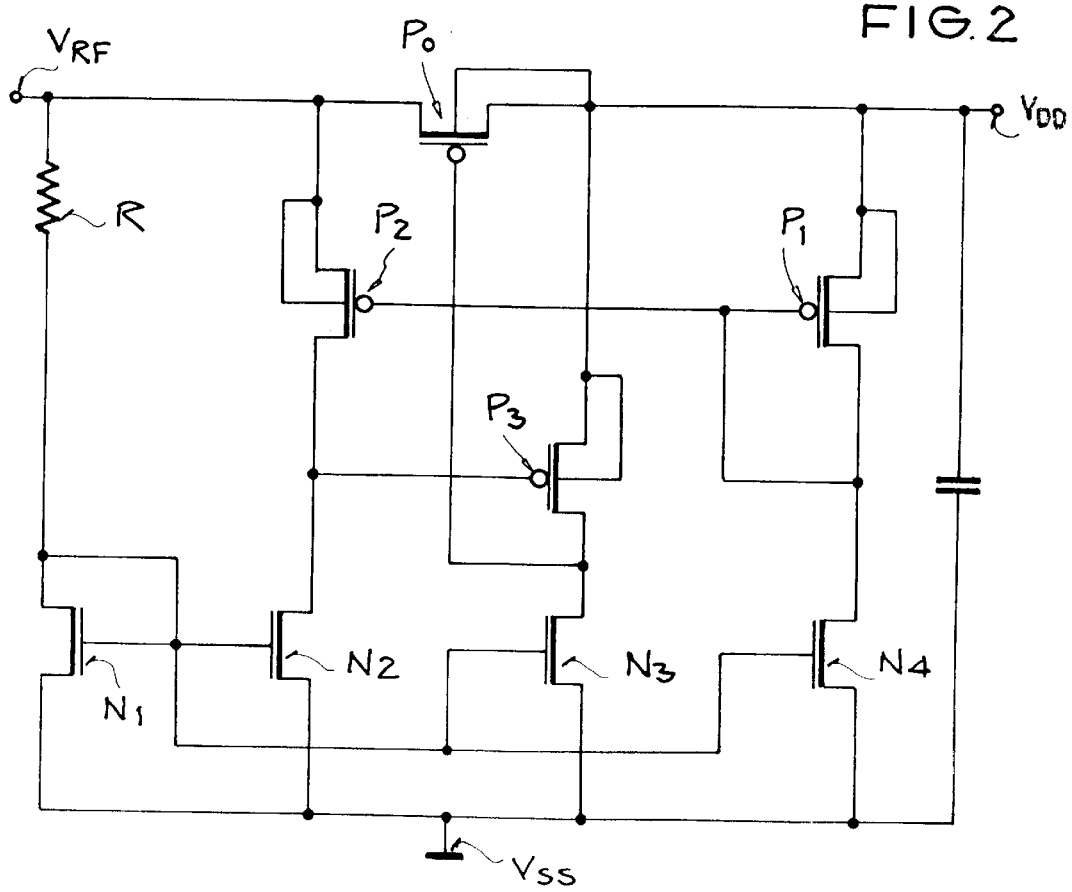
FIG.1
FIG.2

INTEGRATED CIRCUIT ARRANGEMENT WITH DIODE CHARACTERISTIC

BACKGROUND OF THE INVENTION

The invention relates to an integrated circuit arrangement with a diode characteristic between its input and output terminals.

Contactless identification systems consist of a data carrier (transponder) and a read/write unit. Communication between the data carrier and the read/write unit is effected without contact. The data carriers have an integrated circuit which obtains its power from a high-frequency field via a coil. This coil not only generates the supply voltage for the circuit, it also handles data transfer. The circuit comprises the data memory and all circuitries required for handling data transfer. Furthermore, the power required for the circuit must be obtained through a rectifier from the coil voltage induced by the read/write unit. The rectifier can, for example, be an integrated bridge rectifier connected on both sides of the type described in DE 34 00 973 A1. This rectifier arrangement has the advantage that no voltage drop occurs at the various bridge elements. When MOS transistors are used, the bridge rectifier connected on both sides does however have the disadvantage that the current can flow back from the d.c.-voltage side to the a.c.-voltage side. A diode, or an MOS transistor connected as a diode, must be therefore be provided at its output to prevent this reverse flow of current. However, a semiconductor diode or an MOS transistor connected as a diode has a voltage drop of approximately 0.7 V or more.

SUMMARY OF THE INVENTION

The object of the invention is therefore to provide a circuit arrangement with which current can flow in a certain direction and which has a voltage drop of only a few millivolts. This object is solved by a circuit arrangement with a source-drain section of a first transistor arranged in the current path between its input and output terminals, with a first inverter stage with an output fed back to its input, where the power supply for the first inverter stage is provided from the voltage on the output side of the circuit arrangement; with a second inverter stage to the input of which the output signal from the first inverter stage is fed and where the power supply is provided from the voltage on the input side of the circuit arrangement; and with a third inverter stage to the input of which the output signal from the second inverter stage, is fed, where the supply power for the third inverter stage is provided from the voltage on the output side of the circuit arrangement, and the output signal of the third inverter stage is fed to the gate electrode of the first transistor, and thus regulates the current flow in the current path of the circuit arrangement.

In an advantageous development of the invention the three inverter stages are formed reference transistors operating in opposition to respective current sources.

In particular, it is provided for that each inverter stage consists of the series circuit of the source-drain sections of a P-channel transistor and an N-channel transistor, and that the connection point of the N-channel transistor and the P-channel transistor forms the output of the respective inverter, and that the gate electrode of the P-channel transistor forms the input of the inverter stage.

It is advantageous if the P-channel transistor is connected with the potential on the output side and the N-channel transistor is connected with the common to round of reference potential for the circuit arrangement.

The advantageous development of the circuit arrangement is in accordance with the features of the Subclaims.

BRIEF DESCRIPTION OF THE DRAWINGS

FIG. 1 shows a first embodiment example of the circuit arrangement with diode characteristic.

FIG. 2 shows the embodiment example in accordance with FIG. 1 with transistors operating in opposition to the current sources as inverter stages.

DETAILED DESCRIPTION OF THE PREFERRED EMBODIMENTS

Figure 3:
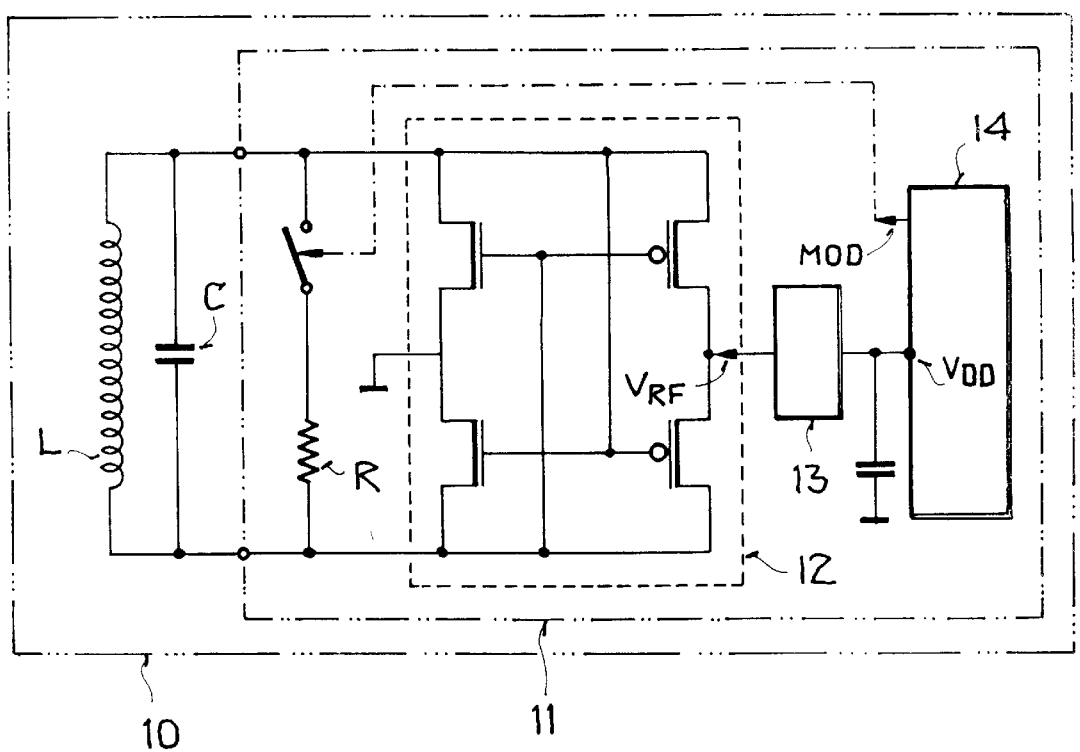
FIG. 3 shows the application of the circuit arrangement in accordance with FIG. 1 as a source of power to an identification circuit.

FIG. 1 shows a first embodiment example of the circuit arrangement with a diode characteristic in accordance with the invention. The circuit arrangement includes a field effect transistor $P_o$ placed in the current path between the input and output of the circuit arrangement. The in-circuit source-drain section of transistor assumes the function of a diode. If the voltage $V_{RF}$ at the input side is greater than the voltage $V_{DD}$ at the output side, the gate electrode of transistor $P_o$ is driven in such a way that the transistor becomes conductive and current can flow. If the voltage ratio is inverted and the voltage $V_{DD}$ on the output side is greater than the voltage $V_{RF}$ on the input side, the gate electrode is driven in such a way that the transistor blocks and a flow of current in the opposite direction is prevented.

The gate electrode of the transistor $P_o$ is driven by three inverter stages 1–3 connected in series. A first inverter stage 1 obtains its supply voltage from the potential $V_{DD}$ on the output side. Its output is coupled back to its input. This results in a signal level at the output or at the input that lies between the common ground potential of the circuit arrangement and the voltage on the output side $V_{DD}$. The output signal A from the first inverter stage 1 is supplied to the input of a second inverter stage 2. The supply voltage of the second inverter stage is derived from the voltage $V_{RF}$ on the input side. The output signal B from the second inverter stage 2 is supplied to the input of a third inverter stage 3. The supply voltage of the third inverter stage 3 is derived from the voltage $V_{DD}$ on the output side. The output signal C from the third inverter stage 3 is supplied to the gate electrode of the P-channel MOS transistor $P_o$ placed in the current path and thus determines the flow of current in the current path of the circuit arrangement.

Owing to the negative feedback from output to input, a signal is generated at the output of the first inverter stage 1 that has approximately one-half of the voltage $V_{DD}$ on the output side. Since the power supply to the second inverter stage 2 is derived from the voltage on the input side, the output signal A from the first inverter stage is sufficient to drive the second inverter stage only if the voltage $V_{DD}$ on the output side is greater than the voltage $V_{RF}$ on the input side. The output signal B from the second inverter stage then corresponds largely to the common frame potential GND which is then inverted once again by the third inverter stage. Since the power supply to the third inverter stage is derived from the voltage $V_{DD}$ on the output side, the output signal C from the third inverter stage corresponds largely to the voltage $V_{DD}$ on the output side. This signal is now supplied to the gate electrode of the P-MOS transistor in the current path and this transistor then blocks accordingly.

If the voltage $V_{DD}$ on the output side is smaller than the voltage $V_{RF}$ on the input side, the output signal B from the second inverter 2 corresponds largely to the voltage $V_{RF}$ on the input side. This signal is sufficient to drive the third inverter stage 3. The output signal from the third inverter stage then corresponds largely to the common ground potential GND. Hence, the P-MOS transistor in the current path is unblocked and current can flow from the input side to the output side.

The diode behavior is produced by a suitable asymmetric dimensioning of the inverters. The asymmetric dimensioning leads to the voltage drop along the circuit arrangement of several millivolt. If the design were absolutely symmetrical, the circuit would not function.

FIG. 2 shows the circuit arrangement in accordance with FIG. 1 with inverter stages that make use of P-channel transistors operating in opposition to the current sources. The current sources are formed by a current balancing circuit comprising four N-channel transistors N1–N4. The first transistor N1 in the current balancing circuit is connected as a diode and is connected on the one hand through the resistor R to the voltage $V_{RF}$ on the input side, and on the other hand to the common to ground potential $V_{SS}$. The gate electrodes of the four transistors N1–N4 in the current balancing circuit are connected together and through the resistor R to the voltage $V_{RF}$ on the input side.

The first inverter stage A is made up of a first P-channel transistor P1 and the fourth transistor N4 in the current balancing circuit. The output of the first inverter stage, situated at the point where the two $P_o$ and N4 transistors are connected, is fed back to the gate electrode of the first transistor P1, corresponding to the input of the first inverter stage. The series circuit of the source-drain sections of the first P-channel transistor P1 and the fourth transistor N4 of the current balancing circuit is situated between the voltage $V_{DD}$ on the output side and the common ground potential $V_{SS}$.

The second inverter stage B is formed by a second P-channel transistor P2 and the second transistor N2 of the current balancing circuit. The series circuit of the source-drain sections of the two transistors P2, N2 is situated between the voltage $V_{RF}$ on the input side and common ground potential. The input on the second inverter stage formed by the gate electrode of the second P-channel transistor P2 is connected to the gate electrode of the first P-channel transistor P7. The connection point between the second P-channel transistor P2 and the second transistor N2 of the current balancing circuit corresponds to the output of the second inverter stage and is connected to the input of the downstream third inverter stage. This thus inverter store is formed by a series circuit comprising a third P-channel transistor P3 and the third transistor N3 in the current balancing circuit. The series circuit is connected on the one hand with the voltage $V_{DD}$ on the output side and on the other hand with the common ground potential $V_{SS}$. The connection point between the two transistors $P_o$ and N4 is connected to the control electrode of the transistor $P_o$ whose source-drain section is situated in the current path of the circuit arrangement.

The diode behavior is produced by a suitable asymmetric dimensioning of the transistors. The asymmetric dimensioning leads to the voltage drop along the circuit arrangement of several millivolt. If the design were absolutely symmetrical, the circuit would not function.

The transistor $P_o$ is conductive as long as the voltage $V_{DD}$ on the output side is smaller than the voltage $V_{RF}$ on the input side. If the voltage $V_{DD}$ on the output side is larger than the voltage $V_{RF}$ on the input side, the transistor $P_o$ blocks and prevents current from flowing in the reverse direction. The circuit arrangement thus has a diode characteristic except that along the circuit section no voltage drop occurs or only a small voltage drop occurs.

FIG. 3 shows the data carrier or transponder 10 of a system for contactless identification. The transponder 10 consists of an oscillating circuit with a coil L and a capacitor C and an integrated circuit 11. The integrated circuit has two connections to which the oscillating circuit is connected. The a.c. voltage induced in the coil by an external alternating field generated by a read/write unit is rectified by the bridge rectifier 12 connected on both sides and supplied through the electronic diode 13 as supply voltage $V_{DD}$ to the logic and memory block 14 of the integrated circuit 11. The electronic diode 13 of FIG. 3 corresponds to one of the circuit arrangements shown in FIGS. 1 and 2. The circuit itself dampens the coil through the load R connected in parallel in such a way that the information to be read out is transmitted to the external read/write unit. Neither in its input circuitry at rectifier 12 nor at the electronic diode 13 does the circuit have an appreciable voltage drop. Consequently, the effective range within which the circuit can still be supplied with sufficient power is increased drastically.

In the circuit according to the embodiment example, the P-channel and N-channel transistors can be interchanged if the signs of the potentials are inverted without this resulting in a new circuit arrangement not covered by the invention.

What is claimed is:

1. An integrated circuit arrangement with a diode characteristic comprising: a first transistor having a source-drain section arranged in a current path between an input and an output of the circuit arrangement and having a gate electrode; a first inverter stage with an output fed back to an input, and with the supply voltage for the first inverter stage being provided by the voltage at the output of the circuit arrangement; a second inverter stage having an input connected to receive an output signal from the first inverter stage and with the supply voltage of the second inverter stage being provided by the voltage at the input of the circuit arrangement; and a third inverter stage having an input connected to receive an output signal from the second inverter stage with the supply voltage for the third inverter stage being provided by the voltage at the output of the circuit arrangement, and with an output signal of the third inverter stage being fed to the gate electrode of the first transistor to regulate the current flow in the current path of the circuit arrangement.

2. An integrated circuit arrangement in accordance with claim 1 wherein each inverter stage consists of a series circuit of source-drain sections of a respective P-channel transistor and a respective N-channel transistor, with a common connection point of the N-channel transistor and the P-channel transistor forming an output of the respective inverter stage, and with a gate electrode of the respective P-channel transistor forming the input of the respective inverter stage.

3. An integrated circuit arrangement in accordance with claim 2, wherein a non-common connection of each P-channel transistor is connected with the potential at one of the input and the output of the circuit arrangement and the non-common connection of each N-channel transistor is connected with a common ground potential.

4. An integrated circuit arrangement in accordance with claim 3 further comprising a further N-channel transistor having a source drain section connected in series with a resistor between the input of the circuit arrangement and the common ground potential, and means connecting the common connection of the resistor and the further N-channel transistor to a gate electrode of each of said N-channel transistors.

* * * * *